(12) United States Patent
Kudo

(10) Patent No.: US 7,057,782 B2
(45) Date of Patent: Jun. 6, 2006

(54) OPTICAL SCANNER AND COLOR IMAGE FORMING APPARATUS USING THE SAME

(75) Inventor: Genichiro Kudo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/304,955

(22) Filed: Nov. 27, 2002

(65) Prior Publication Data

US 2003/0112486 A1 Jun. 19, 2003

(30) Foreign Application Priority Data

Dec. 19, 2001 (JP) ......................... 2001/386039

(51) Int. Cl.
*G02B 26/08* (2006.01)

(52) U.S. Cl. ........................ 359/216; 250/234
(58) Field of Classification Search ................. 359/201, 359/203, 204, 218, 219; 347/232, 234, 243; 250/234
See application file for complete search history.

(56) References Cited

U.S. PATENT DOCUMENTS

| 6,124,962 | A | 9/2000 | Kamikubo | 359/205 |
| 6,288,818 | B1 * | 9/2001 | Yoshimaru | 359/204 |
| 6,323,955 | B1 * | 11/2001 | Kanai et al. | 347/177 |
| 2003/0128270 | A1 | 7/2003 | Kato | 347/223 |

FOREIGN PATENT DOCUMENTS

| EP | 1 096 292 A2 | 5/2001 |
| JP | 4-313776 | 11/1992 |
| JP | 5-19586 | 1/1993 |
| JP | H07-28113 | 10/1995 |
| JP | H09-258126 | 10/1997 |
| JP | H10-048548 | 2/1998 |
| JP | H10-206728 | 8/1998 |
| JP | 2000-330050 | 11/2000 |
| JP | 2001-281570 | 10/2001 |

\* cited by examiner

*Primary Examiner*—Euncha P. Cherry
(74) *Attorney, Agent, or Firm*—Fitzpatrick, Cella, Harper & Scinto

(57) ABSTRACT

The present invention has an object to provide a highly accurate optical scanner of a simple construction which permits reduction of jitter caused by a division error of the deflection surface of a polygonal deflector, and to provide a color image forming apparatus using the same. The optical scanner of the invention comprises a plurality of scanning units each having a polygonal deflector onto which a flux emitted from a light source is directed, and a scanning optical system which forms the flux reflection-deflected by the polygonal deflector into spots on a surface to be scanned. In the optical scanner of the invention, two or more scanning units commonly use a single polygonal deflector. The two or more scanning units use fluxes reflection-deflected on different deflection surfaces of the polygonal deflector, and the write timing of the two or more scanning units onto the surface to be scanned is determined by detecting fluxes from different deflection surfaces of the polygonal deflector by a single write position detector, and by using signals from that detector.

17 Claims, 14 Drawing Sheets

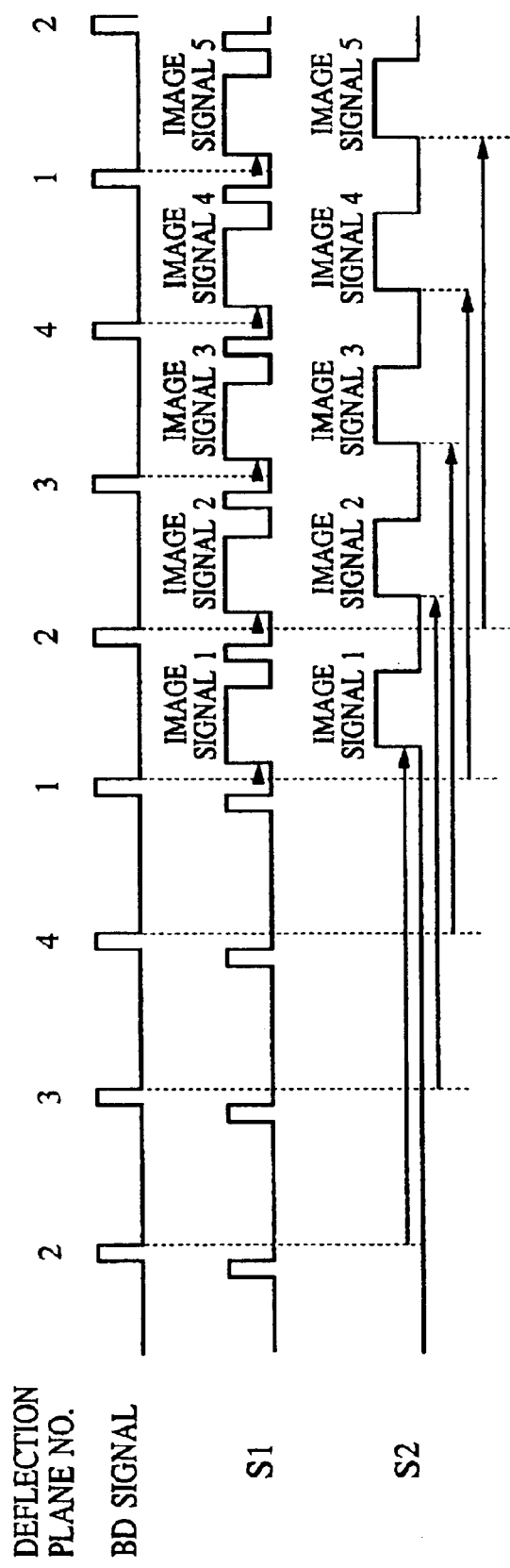

OPTICAL SCANNER AND COLOR IMAGE FORMING APPARATUS USING THE SAME

BACKGROUND OF THE INVENTION

1. Field of the Invention

The present invention relates to a color image forming apparatus. More particularly, the invention relates to a color image forming apparatus suitable for use in a laser printer, a digital copying machine, or a multi-function printer, in which a plurality of fluxes emitted from a plurality of light source means scan the corresponding surfaces to be scanned via a single polygonal deflector (polygonal mirror).

2. Description of the Related Art

It is the conventional practice to scan the surfaces of a plurality of photosensitive drums via a single polygonal mirror by means of fluxes emitted from a plurality of light source means, and deflection-scan on two or more different deflection surfaces. The write positions of the surfaces of the photosensitive drums are detected by any of the following two methods.

(1) Japanese Patent Laid-Open No. 5-19586 discloses a method of determining a write position on a photosensitive drum on the basis of retrieval information obtained from write position detecting means; and (2) Japanese Patent Laid-Open No. 4-313776 shown in FIG. 11 discloses a method of detecting a write position by a single write position detecting means, and determining other write positions on the basis of write position information of a deflection surface from among a plurality of deflection surfaces.

More specifically, all four different stations S1 to S4 begin writing simultaneously on the basis of respective image signals with reference to a write position detection signal (BD signal) 801 for the station S1 (right end station in FIG. 11).

FIG. 1 is a timing chart illustrating the timing of writing an image after detection of a write position detection signal by a write position detecting means in the color image forming apparatus shown in FIG. 11. As shown in FIG. 12, all the stations S1 to S4 begin writing simultaneously on the basis of respective image signals with reference to a BD signal for the station S1.

The above-mentioned conventional write position detecting methods have the following problems.

In the method (1) above, it is necessary to provide an optical element, a light receiving element (a light receiving sensor), an electric base and the like for each of the plurality of write position detecting means. This results in a complicated apparatus as a whole, causing a higher cost. A unit for controlling rotation of the polygonal deflector is required. This makes it difficult to downsize the apparatus as a whole.

In the method (2) above, a write positional shift (jitter) is produced by a manufacturing error such as a division error of the polygonal mirror deflection surfaces. This causes deterioration of the image quality, and makes it difficult to obtain a highly accurate image. When employing this apparatus as a color image forming apparatus, a difference in write positions in the main scanning direction between colors causes problems such as the occurrence of color shift.

SUMMARY OF THE INVENTION

It is an object of the present invention to provide an optical scanner of a highly accurate and simple configuration which permits reduction of jitter caused by division errors of the deflection surfaces of the polygonal deflector.

Another object of the invention is to provide a color image forming apparatus which yields a highly accurate color image free from jitter when applying the optical scanner in a color image forming apparatus.

A first aspect of the present invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned, wherein:

two or more scanning units from among the plurality of scanning units commonly use the polygonal deflector, and the two or more scanning units use fluxes reflection-deflected on different deflection surfaces of the polygonal deflector; and a write timing of the two or more scanning units onto the surface to be scanned is determined by applying fluxes from different deflection surfaces of the polygonal deflector to a single write position detecting means, and by using a signal from the write position detecting means.

A second aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned, wherein:

two or more scanning units from among the plurality of scanning units commonly use the polygonal deflector, and the two or more scanning units use fluxes reflection-deflected on different deflection surfaces of the polygonal deflector; and the write timing of each of the two or more scanning units, when the number of the deflection surfaces is three, detects a flux coming via a deflection surface preceding by two surfaces in the rotating direction, thereby obtaining a beam write position detecting signal.

A third aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned, wherein:

two or more scanning units from among the plurality of scanning units commonly use the polygonal deflector, and the two or more scanning units use fluxes reflection-deflected on deflection surfaces not opposite to each other on the polygonal deflector; and the write timing of each of the two or more scanning units, when the number of the deflection surfaces is four, detects a flux coming via a deflection surface preceding by three surfaces in the rotating direction, thereby obtaining a beam write position detecting signal.

A fourth aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned, wherein:

two or more scanning units from among the plurality of scanning units commonly use the polygonal deflector on deflection surfaces of the polygonal deflector; and the write timing of each of the two or more scanning units, when the number of the deflection surfaces is five, detects a flux coming via a deflection surfaces preceding by three or four surfaces in the rotating direction, thereby obtaining a beam write position detecting signal.

A fifth aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned, wherein:

two or more scanning units from among the plurality of scanning units commonly use the polygonal deflector, and the two or more scanning units use fluxes reflection-deflected on deflection surfaces not opposite to each other on the polygonal deflector; and the write timing of each of the two or more scanning units, when the number of the deflection surfaces is six, detects a flux coming via a deflection surface preceding by four surfaces in the rotating direction, thereby obtaining a beam write position detecting signal.

A sixth aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned; wherein:

two or more scanning units from among the plurality of scanning units commonly use the polygonal deflector, and the two or more scanning units use fluxes reflection-deflected on deflection surfaces not opposite to each other on the polygonal deflector; and the write timing of each of the two or more scanning units, when the number of the deflection surfaces is eight, detects a flux coming via a deflection surface preceding by six surfaces in the rotating direction, thereby obtaining a beam write position detecting signal.

A seventh aspect of the invention provides an optical scanner comprising a plurality of scanning units each having a polygonal deflector serving as deflecting means onto which a flux emitted from light source means is directed, and a scanning optical system which forms the flux reflection-deflected by the polygonal deflector into spots on a surface to be scanned; wherein:

two or more scanning units from among the plurality of scanning units commonly use the polygonal deflector, and the two or more scanning units use fluxes reflection-deflected on deflection surfaces opposite to a rotation axis of the polygonal deflector; and the write timing of each of the two or more scanning units, when the number of the deflection surfaces is an even number N (N is 2 or a larger even number), detects a flux coming via a deflection surface preceding by (N−N/2) surfaces in the rotating direction, thereby obtaining a beam write position detecting signal.

An eighth aspect of the invention provides an optical scanner according to the first aspect of the invention, wherein the plurality of scanning units comprise two or more scanning units in which fluxes enter into surfaces not opposite to each other relative to the rotation axis of polygonal deflector.

A ninth aspect of the invention provides an optical scanner according to the first aspect of the invention, wherein the plurality of scanning units comprise two or more scanning units in which fluxes enter into surfaces opposite to each other relative to the rotation axis of the polygonal deflector.

A tenth aspect of the invention provides an optical scanner according to the first aspect of the invention, wherein at least two of the light source means of the plurality of scanning units are arranged on a substrate.

An eleventh aspect of the invention provides an optical scanner according the first aspect of the invention, wherein the flux in the main scanning direction incident on the deflection surface of the polygonal deflector has a flux width wider than the width of the deflection surface in the main scanning direction.

A twelfth aspect of the invention provides an optical scanner according to the first aspect of the invention, wherein the optical scanner has write position detecting means for detecting the flux for write timing of the surface to be scanned; the write position detecting means has a synchronization detecting element; and the synchronization detecting element is arranged on the same scanning units.

A thirteenth aspect of the invention provides an optical scanner according to the first aspect of the invention, wherein the optical scanner has write position detecting means for detecting the flux for write timing of the surface to be scanned; and the flux running toward the write position detecting means via the polygonal deflector does not pass through the scanning lens system.

A fourteenth aspect of the invention provides an optical scanner according to the first aspect of the invention, wherein the optical system forming the flux emitted from the light source means into a line image in the main scanning direction is formed in a plastic mold.

A fifteenth aspect of the invention provides a color image forming apparatus having a plurality of scanning units according to any one of the first to seventh aspects of the invention; and a plurality of image carriers arranged on the surface to be scanned of each of the scanning units and forming images of colors different from each other.

A sixteenth aspect of the invention provides a color image forming apparatus according to the fifteenth aspect of the invention, having a printer controller which converts color signals entered from an external device into image data of different colors, and enters the image data into the respective scanning unit.

Further objects, features and advantages of the present invention will become apparent from the following description of the preferred embodiments (with reference to the attached drawings).

BRIEF DESCRIPTION OF THE DRAWINGS

FIG. 4 is a timing chart illustrating a timing of determining a write position in the first embodiment of the invention;

DESCRIPTION OF THE PREFERRED EMBODIMENTS

First Embodiment

Figure 1:
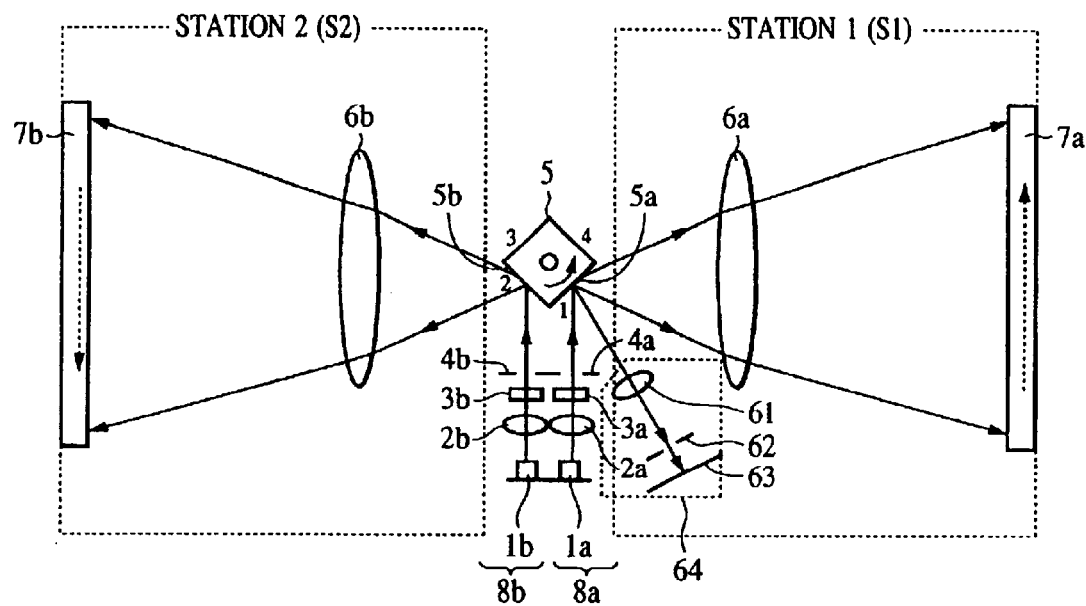
FIG. 1 is a main scanning sectional view of a first embodiment of the present invention.
Figure 2:
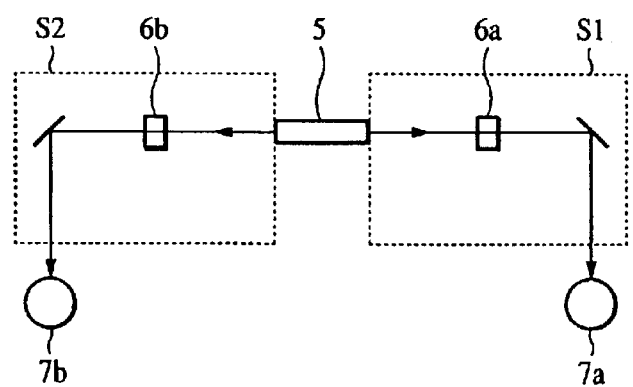
FIG. 2 is a sub-scanning sectional view of the first embodiment of the invention.
Figure 3A:
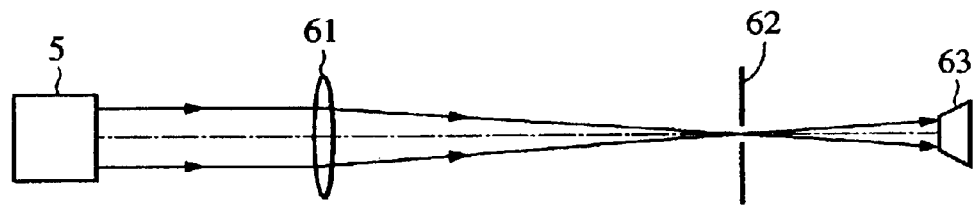
FIG. 3 is a partial sectional view of the write position detecting means of the first embodiment of the invention.
Figure 3B:
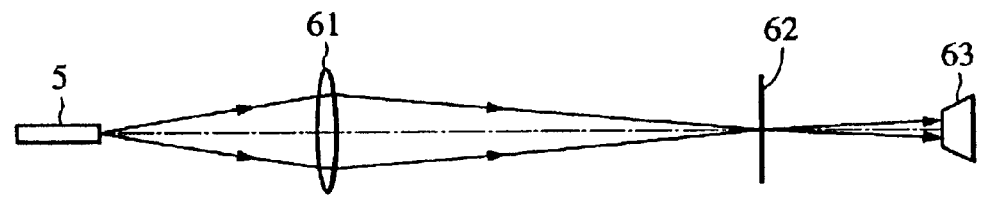

FIG. 1 is a partial sectional view in the main scanning direction (main scanning sectional view) of a first embodiment of the present invention; FIG. 2 is a partial sectional view in the sub-scanning direction (sub-scanning sectional view) of the first embodiment of the invention; and FIGS. 3A and 3B are partial sectional views of write position detecting means (BD optical systems), illustrating only an optical path running toward a synchronous detecting element of a part of fluxes (BD fluxes) reflection-deflected on the deflection surface of the polygonal detector, in an exploded form: FIG. 3A is a main scanning sectional view, and FIG. 3B is a sub-scanning sectional view.

In this specification, a plane formed by the optical axis of the scanning lens system and the flux deflected by the optical deflector is defined as the main scanning cross-section, and a plane perpendicular to the main scanning cross-section including the optical axis of the scanning lens system is defined as the sub-scanning cross-section.

In the drawings, S1 and S2 represent first and second scanning units, respectively (hereinafter referred to as the "stations"). Each of the first and second scanning units comprises first optical elements ($2a$ and $2b$) which convert fluxes from light source means ($1a$ and $1b$) into other fluxes; second optical elements ($3a$ and $3b$) which forms a line image long in the main scanning direction; opening stops ($4a$ and $4b$) which limit the flux; a polygonal deflector 5 serving as deflecting means; and a scanning lens systems ($6a$ and $6b$) which form the fluxes from the polygonal deflector into spots on the surface to be scanned.

In this embodiment, the first and second scanning units S1 and S2 commonly use a polygonal deflector 5, and the first and second scanning units S1 and S2 use fluxes reflection-deflected on different deflection surfaces of the polygonal deflector 5.

In this embodiment, the write timing of the first and second scanning units S1 and S2 onto the photosensitive drum surfaces ($7a$ and $7b$) serving as surfaces to be scanned is determined by detecting fluxes from different deflection surfaces of the polygonal deflector 5 by a single write position detecting means 64 (BD optical system), and using signals from the single write position detecting means.

The first and second scanning units S1 and S2 are configured so that the fluxes are incident on the polygonal deflector 5 from the same direction.

The manner of use of the deflection surfaces of the polygonal deflector 5 covers the case where the fluxes do not use two opposite surfaces.

In the first and second scanning units S1 and S2, the light source means $1a$ and $1b$ each comprises a semiconductor laser (beam source), and the light source means $1a$ and the light source means $1b$ are arranged on a flat substrate. The light source means $1a$ and the light source means $1b$ may be arranged independently of each other.

The first optical elements $2a$ and $2b$ each comprises a collimator lens, and convert fluxes emitted from the light source means $1a$ and $1b$ into substantially parallel fluxes, divergent fluxes or convergent fluxes.

Each of the second optical elements $3a$ and $3b$ comprises a cylindrical lens, formed in a plastic mold, and having a prescribed refractive force only in the sub-scanning direction.

The opening stops $4a$ and $4b$ form the fluxes emitted from the cylindrical lenses $3a$ and $3b$ into a desired beam shape.

The elements such as the light source means ($1a$ and $1b$), the collimator lenses ($2a$ and $2b$), the cylindrical lenses ($3a$ and $3b$), and opening stops ($4a$ and $4b$) form component elements of incident optical means ($8a$ and $8b$).

The polygonal deflector 5 comprises, for example, a polygonal mirror of which the number of deflection surfaces N is 4. The mirror is rotated at a certain speed in the arrow A direction in the drawing by a driving means (not shown) such as a motor. In this embodiment, as described above, the first and second scanning units S1 and S2 commonly use this polygonal deflector 5, and the first and second scanning units S1 and S2 use fluxes reflection-deflected on different deflection surface of the polygonal deflector 5.

A scanning lens system comprises independent scanning lenses $6a$ and $6b$, and forms the fluxes reflection-deflected by the polygonal deflector 5 into spots on the surfaces to be scanned $7a$ and $7b$. The scanning lenses $6a$ and $6b$ have a falldown correcting function by keeping a conjugated relationship between the proximity of the deflection surface of the optical deflector 5 and the proximity of the surfaces to be scanned $7a$ and $7b$ in the sub-scanning cross-section.

Reference numeral 64 represents write position detecting means(BD optical system), which has a synchronization detecting lens 61 (hereinafter denoted as the "BD lens") for synchronization detecting; a slit 62 (hereinafter denoted as the "BD slit"); and a synchronization detecting element 63 (hereinafter denoted as the "BD sensor"), and determines a write timing for the surfaces to be scanned $7a$ and $7b$ of the scanning units S1 and S2.

The BD lens 61 comprises an anamorphic lens in which the curvature in the main scanning direction differs from the curvature in the sub-scanning direction; forms the BD fluxes into an image on the BD slit 62 surface both in the main scanning direction and the sub-scanning direction; scans the BD slit 62 within the main scanning cross-section; and, in the sub-scanning cross section, serves as a falldown correcting system of the deflection surface, because the deflection surface and the BD slit 62 is substantially in a conjugated relationship.

The BD slit 62 determines a write position of the image. The BD slit 62 has a knife edge shape and determines an incident position for the substantially formed spots by the BD lens 61 scanned in the main scanning direction to be incident on the BD sensor 63 surface. The BD detecting accuracy is therefore set higher for the case of the knife edge of the BD slit 62 than for the case of the light receiving and of the BD sensor 63.

The BD sensor 63, being arranged independently of the light source means 1a and 1b in this embodiment, may be arranged on the same substrate as the light source means 1a and 1b.

In the optical path of the BD optical system 64, a member for turning back the flux such as a turn-back mirror may be arranged. This provides an advantage of downsizing the optical scanner. While the BD lenses 61 may be individually provided as in the embodiment, a part of the scanning lens 6a of the first scanning unit S1 may also be used. When using a part of the scanning lens 6a, the BD slit 62 is usually arranged at an optically equivalent position to that of the photosensitive drum surface 7a.

Since the BD flux is formed into an image on the BD slit 62 surface in both the main scanning direction and in the sub-scanning direction, the spot diameter on the BD sensor surface is set so as to be larger than the diameter on the BD slit surface. This configuration thus makes it difficult to be sensitive to a sensitivity irregularity caused by a manufacturing error of the BD sensor or a sensitivity irregularity caused by dust or other adhering matters.

In this embodiment, in the first station S1, the fluxes optically modulated and emitted from the light source means 1a in response to image information are converted by the collimator lens 2a into substantially parallel fluxes or converging fluxes, and enter into the cylindrical lens 3a. The fluxes incident on the cylindrical lens 3a in the main scanning cross-section are emitted as they are and pass through the opening stop 4a (fluxes are partially shielded). In the sub-scanning cross-section, the fluxes converge, pass through the opening stop 4a (partially shielded), and formed into substantially a line image (a line image long in the main scanning direction) on the deflection surface 5a of the polygonal deflector 5. The fluxes reflection-deflected on the deflection surface 5a of the polygonal deflector 5 are formed into a spot image by the scanning lens 6a onto the photosensitive drum surface 7a. The photosensitive drum 7a is thus optically scanned in the arrow B direction (main scanning direction) by rotating the polygonal deflector 5 in the arrow A direction. The image is thus recorded on the photosensitive drum 7a serving as a recording medium.

At this point in time, the timing of the scanning starting position on the photosensitive drum surface 7a, prior to optically scanning the photosensitive drum surface 7a is adjusted. For this purpose, after gathering a part of the fluxes reflection-deflected on the deflection surface 5a of the polygonal deflector 5 (BD fluxes) on the BD slit 62 surface by means of the BD lens 61, the fluxes are introduced into the BD sensor 63. The timing of the scanning start position for recording the image onto the photosensitive drum surface 7a is adjusted by use of the write position detecting signal (BD signal) resulting from detection of an output signal from the BD sensor 63.

In the second station S2, the flux emitted from the light source means 1b enters the deflection surface 5a of the polygonal deflector 5 from the same direction as that of the first scanning unit S1, and the flux reflection-deflected on the deflection surface 5b is formed into a spot image onto the photosensitive drum surface 7 by means of the scanning lens 6b, and is subjected to optical scanning.

Prior to optically scanning the photosensitive drum surface 7b, the timing of the scanning start position on the photosensitive drum surface 7b is adjusted. After collecting a part of the fluxes reflection-deflected on the deflection surface 5b preceding by three surfaces of the deflection surface 5a used for scanning of the first station S1 (BD fluxes) onto the BD slit 62 surface through the BD lens 61, the fluxes are introduced into the BD sensor 63. The timing of scanning start position for image recording to the photosensitive drum surface 7b by use of a write position detection signal (BD signal) is obtained through detection of an output signal from the BD sensor 63.

In general, in an optical arrangement in which, with a number of deflection surfaces of four of the polygonal deflector, fluxes are incident on the polygonal deflector from the same direction as in this embodiment, the write timing of the second station S2 is determined on the basis of the beam write position detection signal preceding by three surfaces of the deflection surface used for scanning of the first station S1.

The number of deflection surfaces is determined by counting the surfaces in the rotating direction as shown by an arrow and displayed as "preceding by N surfaces".

That is, when the number of deflection surfaces is four, the write timing of the second station S2 is determined by detecting BD fluxes deflected on the deflection surface preceding by three surfaces in the rotating direction by the BD optical system 64, thereby obtaining a beam write position detecting signal.

FIG. 4 is a timing chart illustrating a write timing of an image from detection of a BD signal by the BD optical system in this embodiment.

In this embodiment, a flux emitted from the light source means 1a of the first station S1 passes through the BD optical path and is received by the BD sensor 63. As shown in FIG. 4, after the lapse of a certain period of time (certain clock) from startup of a BD signal, an image is formed on the photosensitive drum surface 7a on the basis of image signals from the first station S1.

After the lapse of a certain period of time (certain clock), the second station S2 causes the light source means 1b to emit light on the basis of the BD signal detected three surfaces preceding the current one in the BD optical system 64 in the first station S1, and forms an image on the photosensitive drum surface 7b on the basis of the image signals of the second station S2.

In this embodiment, as described above, jitter produced from a division error of the deflection surface of the polygonal deflector 5 is overcome by detecting BD signals (write position detection signals) to the two photosensitive drum surfaces 7a and 7b by means of a single BD optical system (write position detecting means) 64, thereby achieving an optical scanner, free from a color shift, having a high accuracy and a simple construction.

When applying the present apparatus to a two-color image forming apparatus in this embodiment, it suffices to use only one such apparatus. When using the same for a four-color image forming apparatus as described later, it suffices to form the image by use of two such apparatuses.

In this embodiment, the cylindrical lenses 3a and 3b of the first and second scanning units S1 and S2 are independently provided. The present invention is not however limited to this configuration, but for example, the cylindrical lenses may be integrally formed by a plastic mold or the like. In the first and second scanning units S1 and S2, the fluxes from the light source means (1a and 1b) may be introduced into the polygonal deflector 5 directly via the opening stops (4a and 4b), without using collimator lenses (2a and 2b) or cylindrical lenses (3a and 3b). In the first and second scanning units S1 and S2, each of the scanning lens systems (6a and 6b) comprises a single lens. This is not however limitative, but for example, two or more lenses may be employed.

Figure 13:
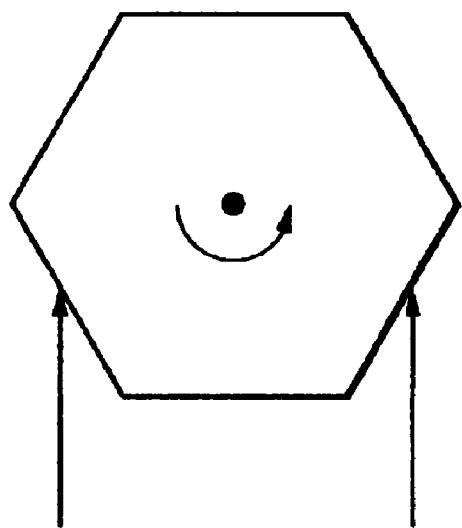
FIG. 13 is a descriptive view illustrating a flux incident on a polygonal deflector (six surfaces)
Figure 14:
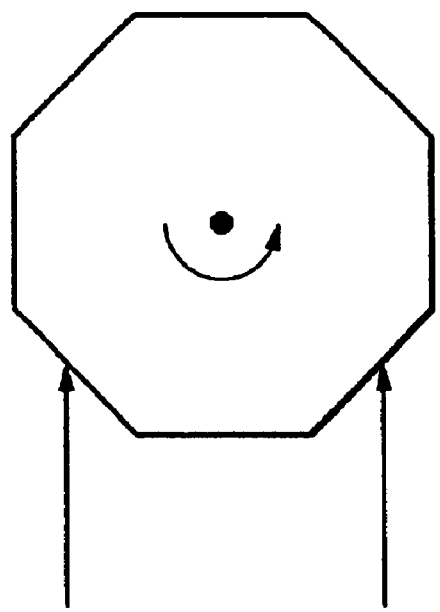
FIG. 14 is a descriptive view illustrating a flux incident on a polygonal deflector (eight surfaces)

In this embodiment, when the number of deflection surfaces of the polygonal mirror is six or eight (even number), a beam write position detection signal is obtained by detecting two fluxes, when using surfaces not opposite to each other from among the deflection surfaces of the polygonal mirror, via the deflection surface preceding by four or six surfaces in the rotating direction as shown in FIGS. 13 and 14.

Figure 15:
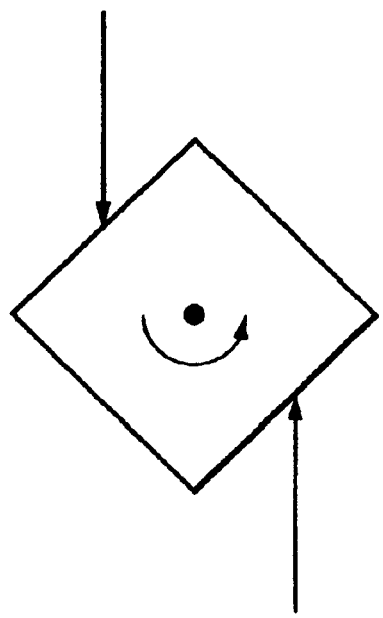
FIG. 15 is a descriptive view illustrating a flux incident on a polygonal deflector (four surfaces)
Figure 16:
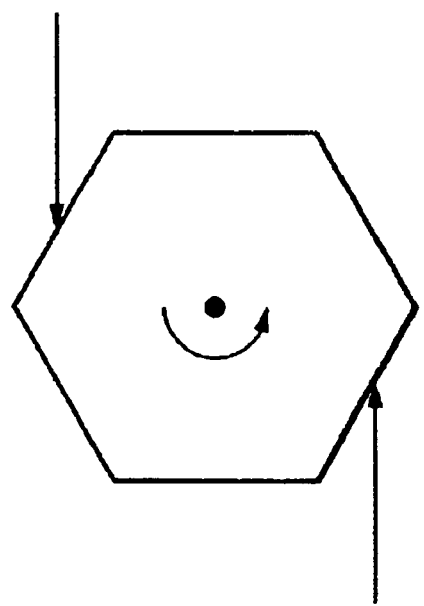
FIG. 16 is a descriptive view illustrating a flux incident on a polygonal deflector (six surfaces)
Figure 17:
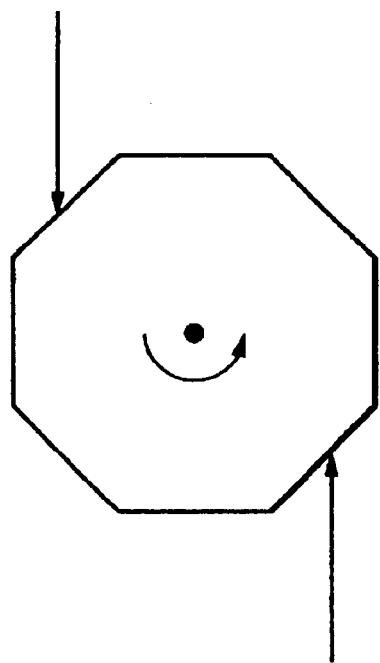
FIG. 17 is a descriptive view illustrating a flux incident on a polygonal deflector (eight surfaces)

Also in this embodiment, when the number of deflection surfaces of the polygonal mirror is four, six or eight (even number), a beam write position detection signal is obtained by detecting two fluxes, when using surfaces opposite to each other from among the deflection surfaces of the polygonal mirror, via the deflection surface preceding by two, three or four surfaces in the rotating direction as shown in FIGS. 15, 16 and 17.

More specifically, for one of the write timings of two or more scanning units, a beam write position detection signal is obtained, when the number of the deflection surfaces is N (N is two or a larger even number), by detecting a flux deflected on the deflection surface preceding by (N−N/2) surfaces in the rotating direction.

Figure 18:
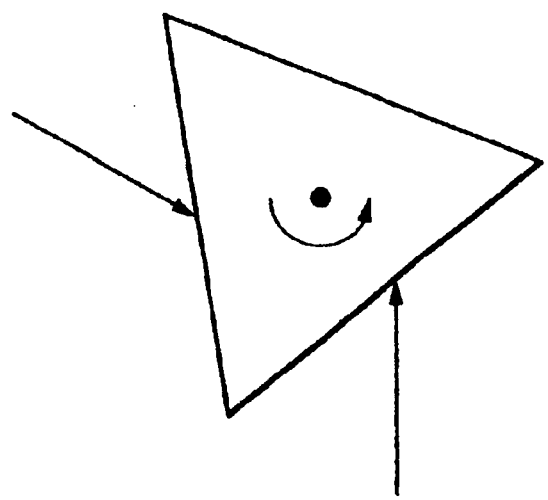
FIG. 18 is a descriptive view illustrating a flux incident on a polygonal deflector (three surfaces)

When the number of deflection surfaces of the polygonal mirror is three, and when using deflection surfaces different from each other in this embodiment, a beam write position detection signal is obtained by detecting a flux deflected on the deflection surface preceding by two surfaces as shown in FIG. 18.

Figure 19:
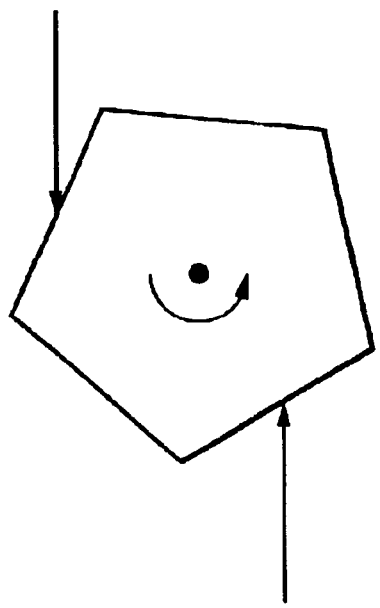
FIG. 19 is a descriptive view illustrating a flux incident on a polygonal deflector (five surfaces)
Figure 20:
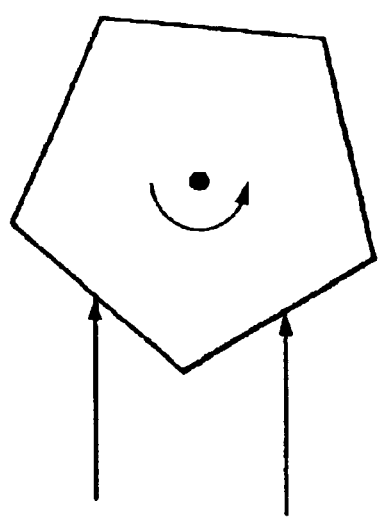
FIG. 20 is a descriptive view illustrating a flux incident on a polygonal deflector (five surfaces).

When the number of deflection surfaces of a polygonal mirror is five, and when using deflection surfaces different from each other from among the deflection surfaces of the polygonal mirror in this embodiment, a beam write position detection signal is obtained by detecting a flux deflected on the deflection surface preceding by three or four surfaces in the rotating direction as shown in FIGS. 19 and 20.

As a result, this embodiment can provide the same advantages as in the above-mentioned first embodiment.

[Color Image Forming Apparatus]

Figure 5:
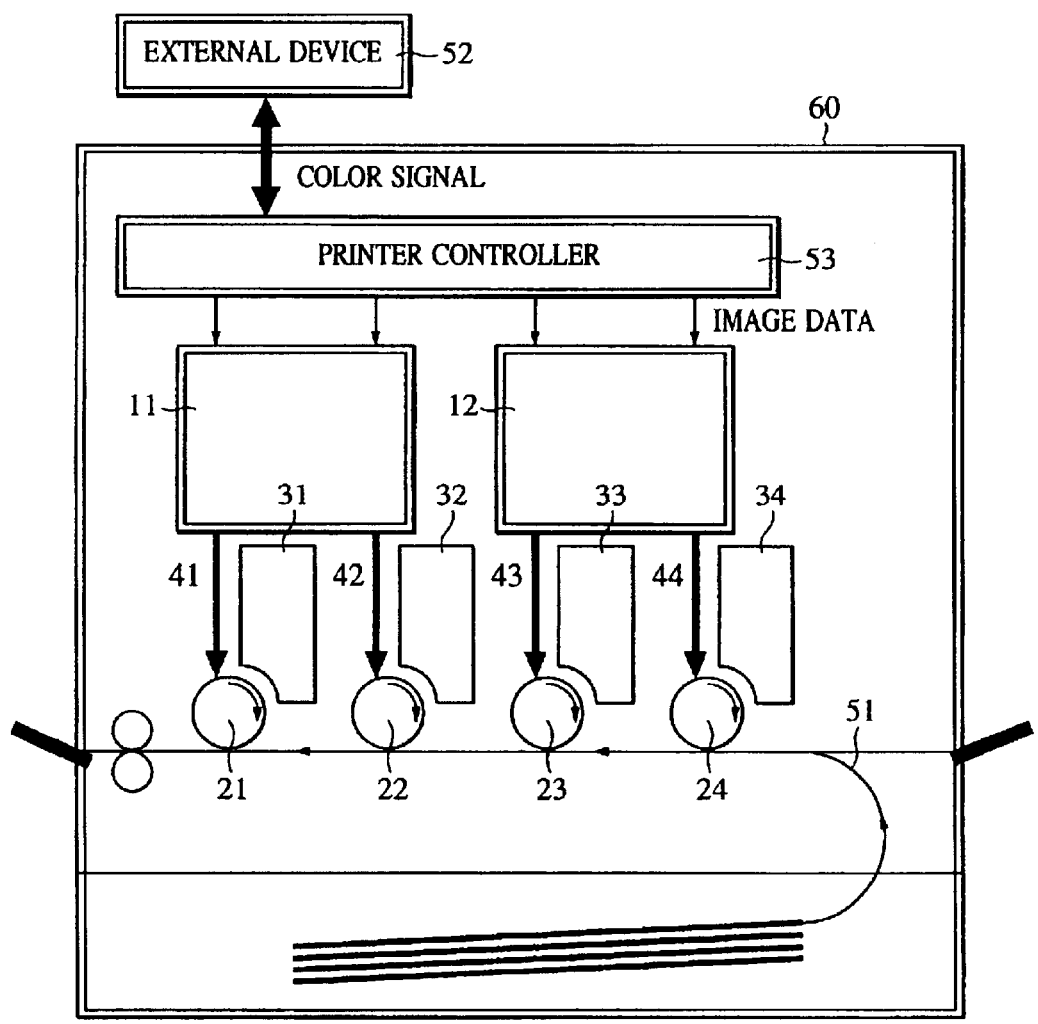
FIG. 5 is a partial schematic view of a color image forming apparatus of an embodiment of the invention.

FIG. 5 is a partial schematic view of the color image forming apparatus of an embodiment of the present invention. This embodiment covers a tandem-type color image forming apparatus in which two optical scanners are arranged, and image information is recorded on a photosensitive drum surface serving as an image carrier in parallel.

In FIG. 5, reference numeral 60 represent a color image forming apparatus; 11 and 12, optical scanners having the same configuration as in the first embodiment; 21, 22, 23 and 24, photosensitive drums serving as image carriers; 31, 32, 33 and 34, developers; and 51, a conveyor belt.

Color signals R (red), G (green) and B (blue) are entered from an external device 52 such as a personal computer into the color image forming apparatus 60. These color signals are converted by a printer controller 53 provided in the apparatus into image data (dot data) of C (cyan), M (magenta), Y (yellow) and B (black). These image data are entered into optical scanners 11 and 12, respectively. Light beams 41, 42, 43 and 44 modulated in response to the image data are emitted from these optical scanners, and the photosensitive surfaces of the photosensitive drums 21, 22, 23 and 24 are scanned by these light beams in the main scanning direction.

The color image forming apparatus of this embodiment has two optical scanners (11 and 12) which record image signals (image information) in parallel onto the surfaces of the photosensitive drums 21, 22, 23 and 24 in response to the individual colors C (cyan), M (magenta), Y (yellow) and B (black), and prints a color image at a high speed.

The color image forming apparatus of this embodiment forms, as described above, latent images of the individual colors on the corresponding surfaces of the photosensitive drums 21, 22, 23 and 24 by using light beams based on the individual image data by means of the two optical scanners 11 and 12. Then, a full-color image is formed by multi-transferring the image on a recording medium.

As the external device 52, for example, a color image reader having a CCD sensor may be employed. In this case, this color image reader and the color image forming apparatus 60 form a color digital copying machine.

Second Embodiment

Figure 6:
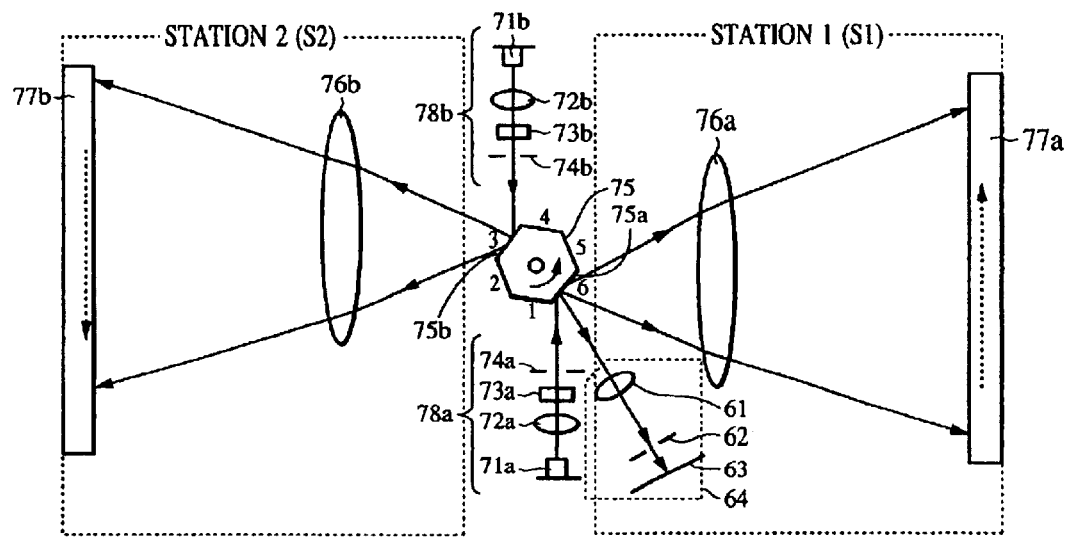
FIG. 6 is a main scanning sectional view of a second embodiment of the invention.

FIG. 6 is a partial sectional view in the main scanning direction of a second embodiment of the present invention (main scanning sectional view). In FIG. 6, the same component elements as in FIG. 1 are represented by the same reference numerals.

The second embodiment differs from the first embodiment in that a polygonal deflector having a number of deflection surfaces N of six is used; two incident optical means 78a and 78b are arranged at positions opposite to each other relative to the polygonal deflector 75 in the main scanning cross-section; and two light source means 71a and 71b are built by a monolithic multi-laser having two light emitting points capable of being independently modulated. The other construction and optical functions are substantially the same as in the first embodiment, thus providing similar advantages.

More specifically, in FIG. 6, 78a and 78b represent incident optical means arranged at positions opposite to each other relative to the polygonal deflector 75 in the main scanning cross-section. The incident optical means 78a and 78b have light source means 71a and 71b comprising monolithic multi-lasers, collimator lenses 72a and 72b, cylindrical lenses 73a and 73b, and opening stops 74a and 74b, respectively.

Reference numeral 75 represents the polygonal deflector comprising a polygonal mirror having a number of deflection surfaces N of six, and is rotated at a certain speed in the arrow A direction by driving means (not shown) such as a motor. In this embodiment, as in the above-mentioned first embodiment, the first and second scanning units (stations) S1 and S2 commonly use the polygonal deflector 75, and the first and second scanning units S1 and S2 use fluxes reflection-deflected on different deflection surfaces of the polygonal deflector 75.

In this embodiment, incident optical means 78a and 78b are arranged at positions opposite to each other relative to the polygonal deflector 75. The configuration comprises a polygonal mirror having an even number of deflection surfaces N (N is two or larger) and uses an optical arrangement using deflection surfaces opposite to each other. The write timing of the second station is determined on the basis of the write position detecting signal of the deflection surface preceding by (N−N/2) surfaces of the deflection surface used for scanning of the first station S1.

More specifically, in the second station S2, the timing of the scanning start position on deflection surface 75b is adjusted by use of a part of fluxes (BD fluxes) reflection-deflected on the deflection surface 75a (preceding by three surfaces of the deflection surface 75b) used for scanning the first station S1.

In this embodiment, as described above, the polygonal deflector 75 comprises a polygonal mirror having six surfaces, and the two light source means 71a and 71b comprise monolithic multi-lasers, thereby achieving an optical scanner having a higher speed than in the above-mentioned first embodiment.

Third Embodiment

Figure 7:
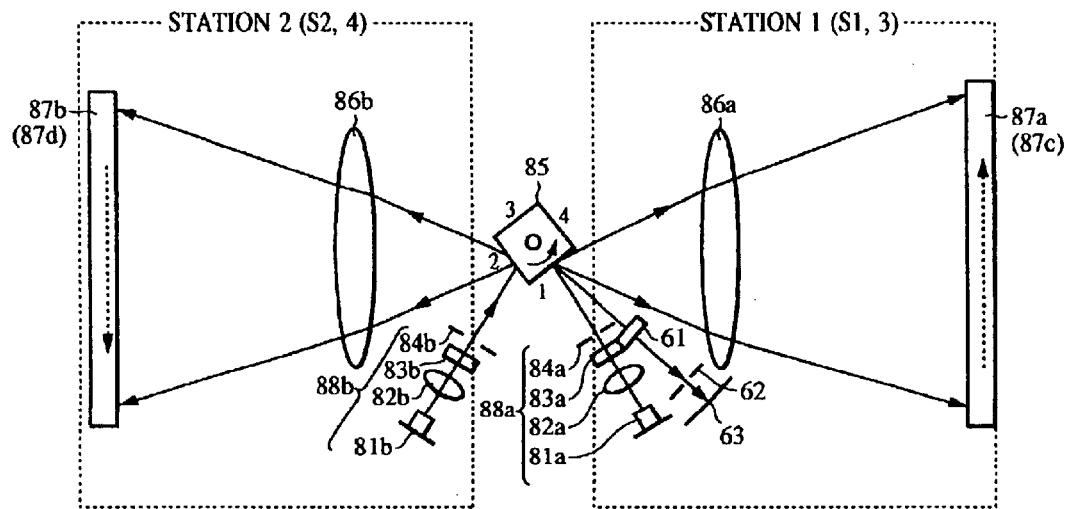
FIG. 7 is a main scanning sectional view of a third embodiment of the invention.
Figure 8:
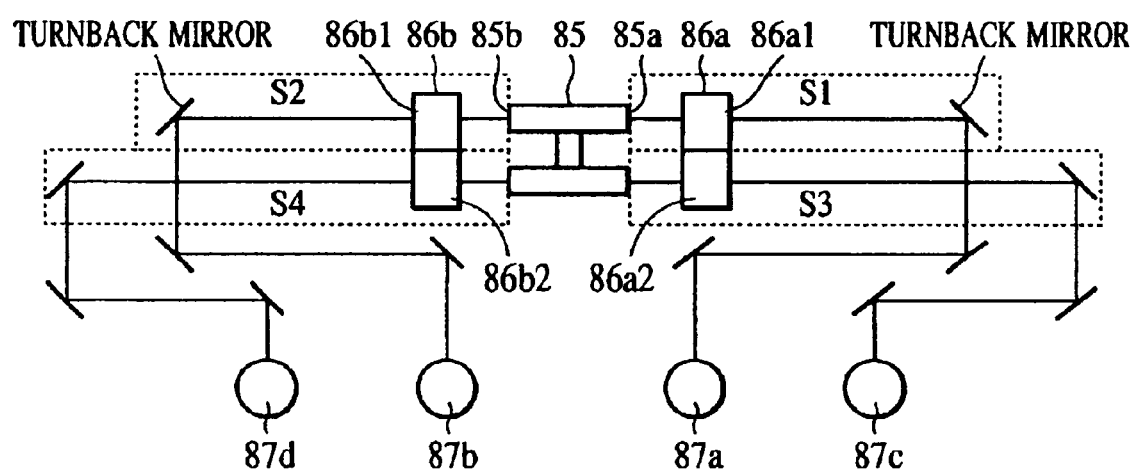
FIG. 8 is a sub-scanning sectional view of a third embodiment of the invention.

FIG. 7 is a partial sectional view in the main scanning direction (main scanning sectional view) of a third embodiment of the present invention; and FIG. 8 is a partial sectional view in the sub-scanning direction (sub-scanning sectional view). In FIGS. 7 and 8, the same component elements as those in FIG. 1 are represented by similar reference numerals.

The third embodiment differs from the above-mentioned first embodiment in that a polygonal deflector 85 has deflection surfaces in two stages within the sub-scanning cross-section and the apparatus comprises first, second, third and fourth scanning units (stations) S1 to S4; and four fluxes emitted from the light source means 81a and 81b for the scanning units S1 to S4 enter into the polygonal deflector 85 at an incident angle of 70°. Other configurations and optical configurations are substantially the same as in the first embodiment, providing similar advantages.

More particularly, in FIGS. 7 and 8, S1 and S3 represent the first and third scanning units (also referred to as "stations"). Each of the first and third scanning units has a collimator lens 82a which converts two fluxes emitted from the light source means 81a composed of two light sources arranged in the sub-scanning direction; a cylindrical lens 83a forming a line image long in the main scanning direction; an opening stop 84a which regulates fluxes; a polygonal deflector 85; and a scanning lens 86 which forms the two fluxes reflection-deflected by the polygonal deflector by the polygonal deflector 85 into spots on the surface 87 of the photosensitive drum 87a.

S2 and S4 represent second and fourth scanning units (hereinafter referred to also as "stations"). Each of the second and fourth scanning units S2 and S4 has a collimator 82b which converts two fluxes emitted from light source means 81b composed of two light sources arranged in the sub-scanning direction; a cylindrical lens 83b which forms a line image in the main scanning direction; an opening stop 84b which regulates fluxes; a polygonal deflector 85; and a scanning lens 86b which forms the two fluxes reflection-deflected by the polygonal deflector 85 into spots on the photosensitive drum 87 surface serving as a surface to be scanned.

In this embodiment, the scanning units S1 to S4 commonly use a single polygonal deflector 85, and the individual scanning units S1 to S4 use fluxes reflection-deflected on different deflection surfaces of the polygonal deflector 85.

In this embodiment, the write timing of the scanning units S1 to S4 onto photosensitive drum surfaces 87a to 87d is determined by detecting fluxes from different deflection surfaces of the polygonal deflector 85 by a write position detecting means (BD optical system), and using signals from this single write position detecting means.

The scanning lenses 86a and 86b are made by integrally forming two lenses arranged in parallel in the sub-scanning direction, and forms four fluxes reflection-deflected by the polygonal deflector 85 into spots on the photosensitive drum surfaces 87a to 87d of the corresponding first to fourth scanning units S1 to S4. The scanning lenses 86a and 86b have a falldown correcting function by keeping a conjugating relationship between the proximity of the deflection surfaces of the optical deflector 85 and the proximity of the photosensitive drum surfaces.

In this embodiment, the four fluxes emitted from the light source means 81a and 81b in the first to fourth scanning units S1 to S4 are all incident on the different deflection surfaces at an incident angle of 70°. The term the incident angle means an angle between the main beam of the fluxes emitted from the light source means 81a and 81b and the optical axis of the scanning lenses 86a and 86b. As a result, it is possible to reduce the pitch unevenness more remarkably than in the first embodiment, thus permitting achievement of a more accurate optical scanner.

In an optical arrangement in which four fluxes emitted from the light source means 81a and 81b are incident on the polygonal deflector in a single direction as in this embodiment, the write timing of the second and fourth stations S2 and S4 onto the photosensitive drums is determined on the basis of a beam write position detection signal for a deflection surface preceding by (N−1) surfaces from the deflection surface used for scanning of the first and third stations S1 and S3.

More specifically, in the second and fourth stations S2 and S4, the timing of the scanning start position on the photosensitive drum surfaces 87b and 87d by use of a part (BD flux) of the fluxes reflection-deflected on the deflection surface preceding by three surfaces from the deflection surface used in scanning of the first and third stations S1 and S3.

In the polygonal deflector 85, the deflection surfaces are arranged in two stages in the sub-scanning direction, and flow fluxes emitted from the light source means 81a and 81b enter the corresponding deflection surfaces of the two-stage polygonal mirror. Since the two-stage polygonal mirror 85 in this embodiment has deflection surfaces which are simultaneously fabricated into equal flat surfaces, the BD optical system 64 suffices to detect only the fluxes deflection-reflected on the deflection surfaces 85a and 85b shown in the upper part of the drawing. That is, for the third and fourth stations S3 and S4, it suffices to adjust the scanning start position timing by use of BD signals available for the first and second stations S1 and S2.

For the scanning lenses 86a and 86b, the upper and lower (in the drawing) lenses (in the sub-scanning direction) (86a1, 86a2, 86b1 and 86b2) are formed integrally and have the same optical properties. A plurality of turn-back mirrors are therefore arranged so as to adjust the optical path lengths to the photosensitive drum surfaces 87a to 87d.

The turn-back mirrors suffice to be arranged so that the optical path lengths to the photosensitive mirrors are uniform, and quite the same advantages are available even with other arrangements.

Figure 9:
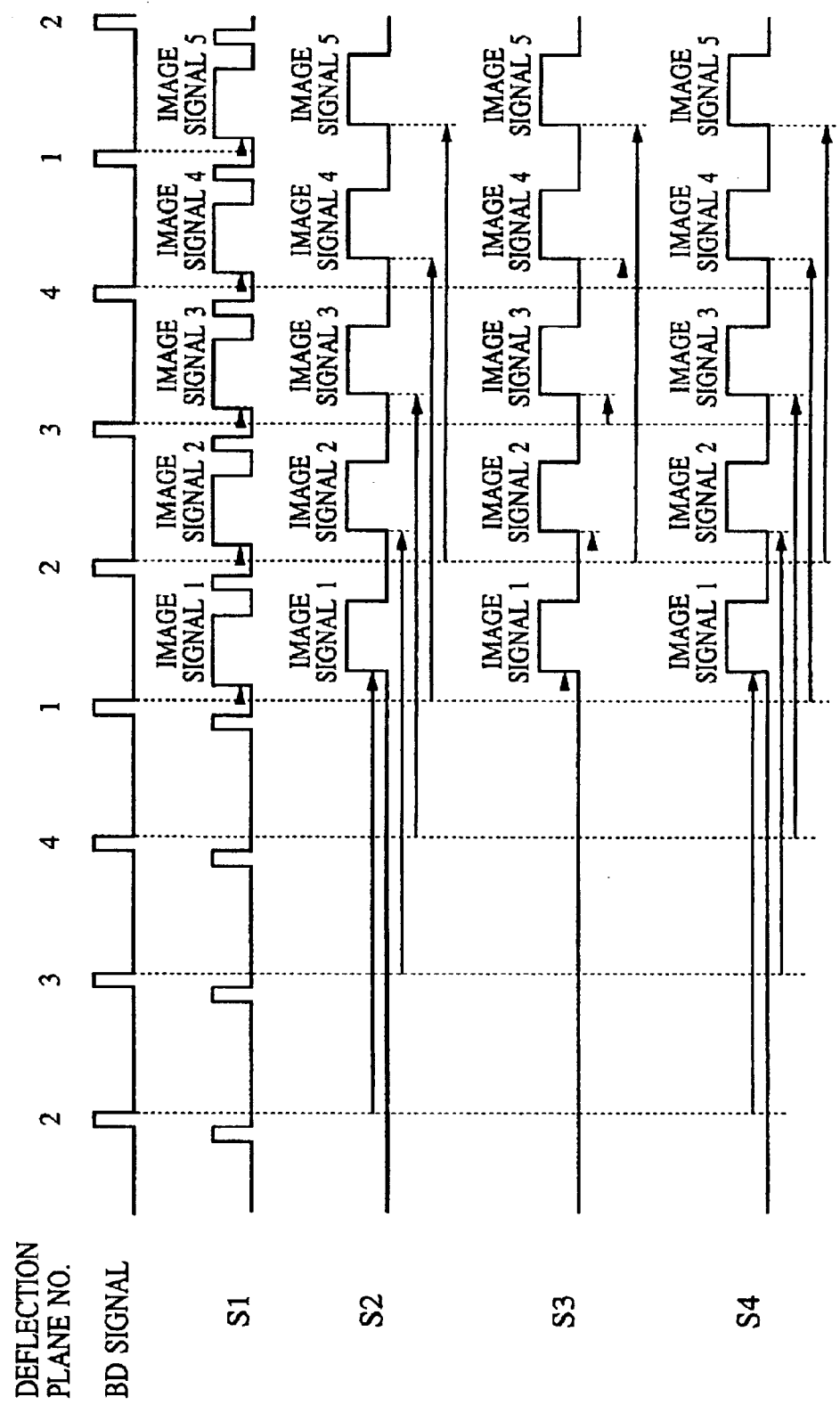
FIG. 9 is a timing chart illustrating the timing of determining a write position in the third embodiment of the invention.

FIG. 9 is a timing chart illustrating the timing of the BD optical system from detection of a write position detection signal up to the writing of an image in this embodiment.

In this embodiment, the flux emitted from the light source of the first station S1 passes through the BD optical path and is received by the BD sensor 63. After the lapse of a certain period of time (certain clock) from startup of a BD signal, an image is formed on the photosensitive drum surface 87a in response to the image signal from the first station S1. For the third station S3, as in the first station S1, after the lapse of a certain period of time (certain clock) from the startup of a BD signal, an image is formed on the photosensitive drum surface 87c on the basis of the image signal from the third station S3.

The second station S2 causes the light source to emit light after the lapse of a certain period of time (certain clock) on the basis of a BD signal detected for a deflection surface preceding by three surfaces in the BD optical system 64 in the first station S1, and forms an image on the photosensitive drum surface 87b on the basis of the image signal from the second station S2. The fourth station S4 operates in the same manner as the second station S2, and an image is formed on the photosensitive drum surface 87d on the basis of the image signal of the fourth station S4.

In this embodiment, as described above, the configuration is such that the fluxes emitted from the light sources of the scanning units S1 to S4 enter the polygonal deflector 85 at an incident angle of 70°, thus permitting further reduction of pitch unevenness than in the first embodiment and achievement of a higher-accuracy optical scanner. By building the polygonal deflector 85 with a polygonal mirror having two stages of deflection surfaces in the sub-scanning direction, a four-color image forming apparatus can be achieved with a single optical scanner.

Fourth Embodiment

Figure 10:
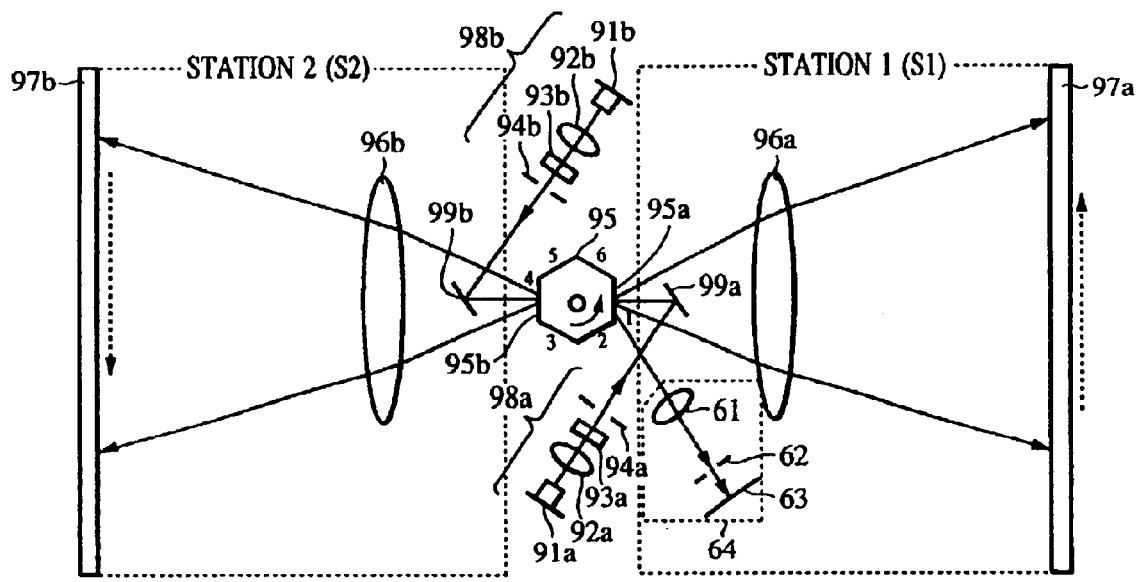
FIG. 10 is a main scanning sectional view of a fourth embodiment of the invention.
Figure 11:
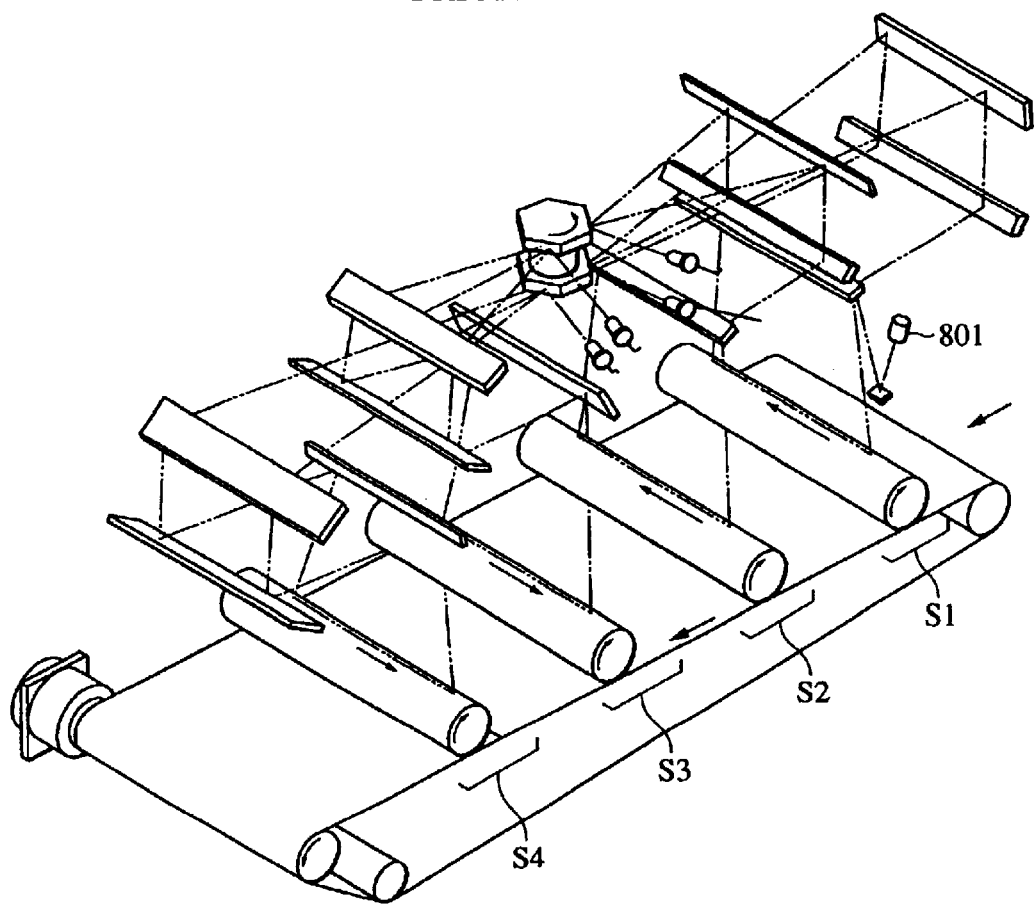
FIG. 11 is a partial schematic view of the conventional color image forming apparatus.

FIG. 10 is a partial sectional view in the main scanning direction of a fourth embodiment of the present invention (main scanning sectional view). In FIG. 10, the same component elements as those shown in FIG. 6 are represented by the similar reference numerals.

This embodiment differs from the above-mentioned second embodiment in that first and second scanning units (stations) S1 and S2 comprise over-field optical systems (OFS optical systems). The other configuration and optical properties are substantially the same as in the first embodiment, giving similar advantages.

More specifically, in this embodiment, fluxes emitted from light source means 91a in the first station S1 are converted by a collimator lens 92 into substantially parallel fluxes or diverging fluxes, and enter a cylindrical lens 93a. From among the fluxes having entered the cylindrical lens 93a, the fluxes in the sub-scanning cross-section converge and are limited through the opening stop 94a, enter a deflection surface 95a of the polygonal deflector 95 via a turn-back mirror 99a and are formed substantially into a line image (line image long in the main scanning direction) in the proximity of the deflection surface. The fluxes incident on the deflection surface 95a enter diagonally relative to a plane perpendicular to the rotation axis of the polygonal deflector, from the sub-scanning cross-section containing the rotation axis of the polygonal deflector 95 and the optical axis of the scanning lens 96a. The fluxes in the main scanning cross-section enter the deflection surface 95a from substantially the center of the deflection angle of the polygonal deflector 95. The flux width of the fluxes in this case is set so that, in the main scanning direction, the flux width is sufficiently larger than the facet width of the deflection surface. The fluxes deflection-reflected on the polygonal deflector 95 are introduced onto the photosensitive drum surface 97a via the scanning lens 96a. The fluxes perform optical scanning in the arrow B direction (main scanning direction) on the photosensitive drum surface 96a by rotating the polygonal deflector 95 in the arrow A direction in the drawing. An image is thus recorded on the photosensitive drum surface 97a serving as a recording medium.

At this point in time, the scanning start position timing on the photosensitive drum surface 97a is adjusted, prior to optically scanning the photosensitive drum surface 97a, by collecting a part of the fluxes reflection-deflected on the deflection surface 95a of the polygonal deflector 95 (BD fluxes) onto a BD slit 62 surface by means of a BD lens 61, and then introducing the same into a BD sensor 63. Using a write position detection signal (BD signal) resulting from detection of an output signal from the BD sensor 63, the timing of the scanning start position of image recording on the photosensitive drum surface 97a is adjusted.

In the second station S2, as in the first station S1, fluxes emitted from the light source means 1b enter the deflection surface 95b of the polygonal deflector 95 from the front in a direction opposite to the incident direction of the first scanning unit S1, and the fluxes reflection-deflected on the deflection surface 95b are formed into spots through a scanning lens 96b onto the corresponding photosensitive drum surface 97b, and subjected to optical scanning.

At this moment, the scanning start position timing on the photosensitive surface 97b is adjusted, prior to optically scanning the photosensitive drum surface 97b, by collecting a part of the fluxes reflection-deflected on the deflection surface 95b preceding by three surfaces to the deflection surface 95a used for scanning of the first station S1 (BD fluxes) onto the BD slit 62 surface through the BD lens 61, and then introducing the same into a BD sensor 62. By using a write position detection signal (BD signal) resulting from detection of an output signal from the BD sensor 63, the timing of the scanning start position of image recording on the photosensitive drum surface 97b is adjusted.

Also in this embodiment, as in the above-mentioned second embodiment, the write timing of the second station S2 is determined on the basis of the write position detection signal for the deflection surface preceding by (N−N/2) surfaces of the deflection surface used for scanning the first station S1.

That is, in the second station S2, the scanning start position timing is adjusted by use of a part of the fluxes reflection-deflected on the deflection surface 95b preceding by three surfaces of the deflection surface 95a used for scanning the first station S1.

In this embodiment, as described above, the first and second scanning units S1 and S2 are built with OFS optical systems, and by detecting the write position detection signal to the two photosensitive drum surfaces 97a and 97b by use of single write position detecting means 64, jitters caused by a division error of the deflection surface of the polygonal deflector 95 are reduced, and a high-accuracy optical scanner having a simple construction is achieved.

According to the present invention, as described above, the write timing onto the surface to be scanned of two or more the scanning units is determined by detecting fluxes from different deflection surfaces of the polygonal deflector by single write position detecting means, and by using signals from the single write position detecting means. It is thus possible to reduce jitter caused by a division error of the deflection surface of the polygonal deflector, and achieve a high-accuracy optical scanner having a simple construction.

According to the present invention, furthermore, when using the optical scanner of the invention for a color image forming apparatus, it is possible to achieve a color image forming apparatus giving a high-accuracy color image free from a color shift.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical scanner comprising:
   a plurality of scanning units, each having a scanning optical system which forms a flux, emitted from a light source means, into spots on a surface to be scanned, a deflecting means having a plurality of deflection surfaces, wherein two or more scanning units from among said plurality of scanning units commonly use said deflecting means, and said two or more scanning units use fluxes reflection-deflected on different ones of said deflection surfaces of said deflecting means; and a single write position detecting means, wherein an image write start time of a first scanning unit in the main scanning direction onto the surface to be scanned and an image write start time of a second scanning unit in the main scanning direction onto the surface to be scanned are each determined by detecting a flux from a different deflection surface of said deflecting means by said single write position detecting means, and by using a write position detection signal from said single write position detecting means, wherein the time from the detection of the write position detection signal before the starting of image writing to the surface to be scanned differs as between said first scanning unit and said second scanning unit, and wherein, in said first scanning unit and said second scanning unit, the fluxes reflection-deflected on respective deflection surfaces of said deflecting means reach said single write position detecting means, respectively, by passing through an optical element which is located independently from said scanning optical system and without passing through said scanning optical system.

2. An optical scanner according to claim 1, wherein the number of said deflection surfaces is three, and one of the image write start times in the main scanning direction of said two or more scanning units onto the surface to be scanned is determined by detecting a flux coming via a deflection surface preceding by two surfaces in the rotating direction, and by using a write position detection signal from said single write position detecting means.

3. An optical scanner according to claim 1, wherein the number of said deflection surfaces is four, and one of the image write start times in the main scanning direction of said two or more scanning units onto the surface to be scanned is determined by detecting a flux coming via a deflection surface preceding by three surfaces in the rotating direction, and by using a write position detection signal from said single write position detection means.

4. An optical scanner comprising according to claim 1 wherein the number of said deflection surfaces is five, and one of the image write start times in the main scanning direction of said two or more scanning units onto the surface to be scanned is determined by detecting a flux coming via a deflection surface preceding by three or four surfaces in the rotating direction, and by using a write position detection signal from said write position detecting means.

5. An optical scanner according to claim 1 wherein the number of said deflection surfaces is six, and one of the image write timings in the main scanning direction of said two or more scanning units onto the surface to be scanned is determined by detecting a flux coming via a deflection surface preceding by four surfaces in the rotating direction, and by using a write position detection signal from said write position detecting means.

6. An optical scanner according to claim 1 wherein the number of said deflection surfaces is eight, and one of the image write start times in the main scanning direction of said two or more scanning units onto the surface to be scanned is determined by detecting a flux coming via a deflection surface preceding by six surfaces in the rotating direction, and by using a write position detection signal from said write position detecting means.

7. An optical scanner according to claim 1, wherein one of the image write start times in the main scanning direction of said two or more scanning units onto the surface to be scanned, when the number of said deflection surfaces is an even number N (where N is 2 or a larger even number), is determined by detecting a flux coming via a deflection surface preceding by (N−N/2) surfaces in the rotating direction, and by using a write position detection signal from said write position detecting means.

8. An optical scanner according to claim 1, wherein said plurality of scanning units comprise two or more scanning units in which fluxes are directed onto surfaces not opposite to each other relative to said deflecting means.

9. An optical scanner according to claim 1, wherein said plurality of scanning units comprise two or more scanning units in which fluxes are directed onto surfaces opposite to each other relative to the rotation axis of said deflecting means.

10. An optical scanner according to claim 1, wherein at least two of the light source means of said plurality of scanning units are arranged on a substrate.

11. An optical scanner according to claim 1, wherein the fluxes in a main scanning direction incident on respective deflection surfaces of said deflecting means each have a flux width wider than the width of said deflection surface in the main scanning direction.

12. An optical scanner according to claim 1, wherein said optical scanner has write position detecting means for detecting the flux for write timing of the surface to be scanned, said write position detecting means has a synchronization detecting element; and said synchronization detecting element is arranged on the same substrate as the light source means of said plurality of scanning units.

13. An optical scanner according to claim 1, wherein said optical scanner has write position detecting means for detecting the flux for write timing of said surface to be scanned, and the flux running toward said write position detecting means via said deflecting means does not pass through said scanning lens system.

14. An optical scanner according to claim 1, wherein the optical system forming the flux emitted from said light source means into a line image in the main scanning direction is formed in a plastic mold.

15. A color image forming apparatus having a plurality of scanning units according to any one of claims 1 to 7, and a plurality of image carriers arranged on the surface to be scanned of each of the scanning units and forming images of colors different from each other.

16. A color image forming apparatus according to claim 15, having a printer controller which converts color signals entered from an external device into image data of different colors, and enters the image data into the respective scanning units.

17. An optical scanner according to claim 1, wherein the direction of the fluxes formed into a spot on the surface to be scanned are mutually opposite in said first scanning unit and said second scanning unit.

* * * * *

UNITED STATES PATENT AND TRADEMARK OFFICE
CERTIFICATE OF CORRECTION

PATENT NO. : 7,057,782 B2
APPLICATION NO. : 10/304955
DATED : June 6, 2006
INVENTOR(S) : Genichiro Kudo It is certified that error appears in the above-identified patent and that said Letters Patent is hereby corrected as shown below:

ON THE TITLE PAGE [56] REFERENCES CITED:

Foreign Patent Documents, "H07-28113" should read ---H07-281113--.

Figure 12:
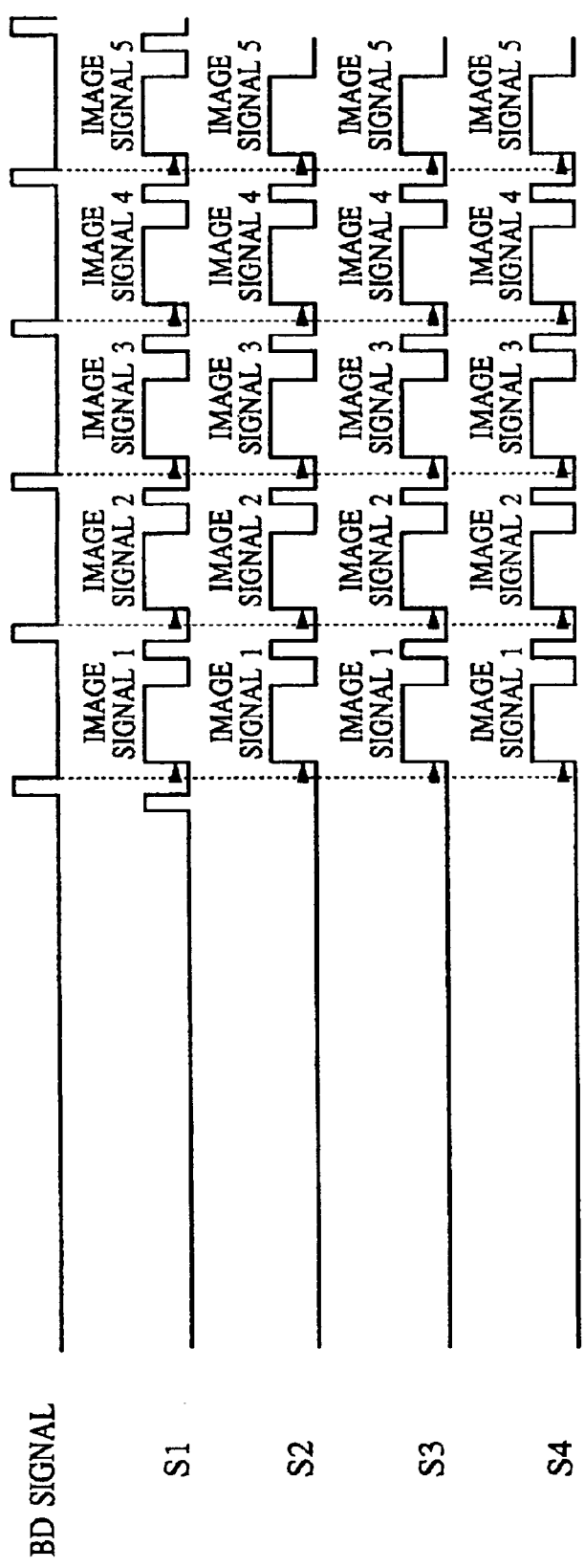
FIG. 12 is a timing chart illustrating the timing of determining a write position.

COLUMN 1:

Line 37, "FIG. 1" should read --FIG. 12--.

COLUMN 3:

Line 8, "surfaces" should read --surface--;
Line 36, "scanned;" should read --scanned,--; and
Line 54, "scanned;" should read --scanned,--.

COLUMN 4:

Line 5, "polygo- " should read --the polygo- --.

COLUMN 5:

Line 49, "form:" should read --form;--;
Line 62, "forms" should read --form--; and
Line 65, "systems" should read --system--.

COLUMN 6:

Line 47, "surface" should read --surfaces--.

COLUMN 7:

Line 5, "is" should read --are--; and
Line 13, "and" should read --end--.

UNITED STATES PATENT AND TRADEMARK OFFICE
CERTIFICATE OF CORRECTION

PATENT NO. : 7,057,782 B2
APPLICATION NO. : 10/304955
DATED : June 6, 2006
INVENTOR(S) : Genichiro Kudo It is certified that error appears in the above-identified patent and that said Letters Patent is hereby corrected as shown below:

COLUMN 8:

Line 5, "surface 7" should read --surface 7b--.

COLUMN 14:

Line 42, "more" should read --more of--.

COLUMN 15:

Line 48, "comprising" should be deleted.

COLUMN 16:

Line 63, "direction" should read --directions--.

Signed and Sealed this

Sixteenth Day of January, 2007

JON W. DUDAS
*Director of the United States Patent and Trademark Office*